United States Patent [19]

Hanson

[11] Patent Number: 5,209,048

[45] Date of Patent: May 11, 1993

[54] HOOF PROTECTIVE DEVICE

[76] Inventor: Peter D. Hanson, 12150 County Rd. M-Y, Grantsburg, Wis. 54840

[21] Appl. No.: 895,091

[22] Filed: Jun. 8, 1992

[51] Int. Cl.⁵ .............................................. B68C 5/00
[52] U.S. Cl. .......................................... 54/82; 168/2
[58] Field of Search .................... 168/2, 18, 22, 27; 54/82

[56] References Cited

U.S. PATENT DOCUMENTS

| 630,310 | 8/1899 | Agnew | 168/2 |
| 3,732,929 | 5/1973 | Glass | 168/18 |
| 3,749,091 | 7/1973 | Basa | 54/82 X |

FOREIGN PATENT DOCUMENTS 2560745  9/1985  France ...................... 54/82

Primary Examiner—Robert P. Swiatek
Attorney, Agent, or Firm—Fuller, Ryan, Hohenfeldt & Kees

[57] ABSTRACT

A protective boot for an animal's hoof having a flexible covering of a general hollow ungulate shape to fit over a hoof. A protective upper portion is connected to the top of the hollow shape to cover the lower leg of the animal. The upper is of sufficient length to extend above the dewclaws on the animal's leg. Securing fastener, such as a strap or Velcro ® near the top of the upper secures the top of the boot around the reduced diameter portion of the animal's leg located above the dewclaws. A hollow tube extends from the upper to beneath the hoof of the animal. The tubing is provided with a branched end extending to opposite sides of the hoof.

5 Claims, 1 Drawing Sheet

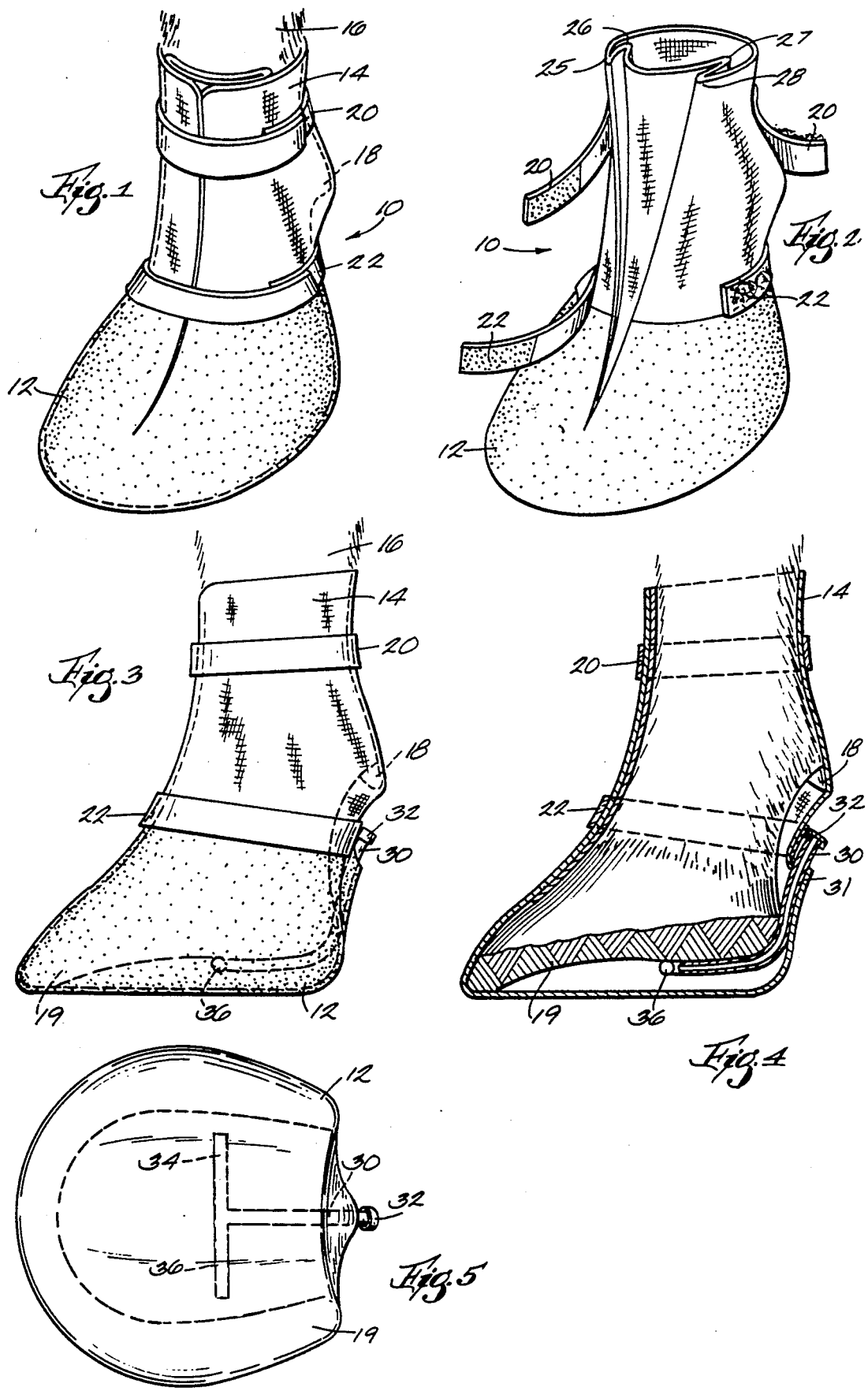

HOOF PROTECTIVE DEVICE

BACKGROUND OF THE INVENTION

This invention relates generally to protective devices for hoofed animals and particularly to such devices which afford superior protection and which have means connected therewith to provide for irrigation and application of medication in the case of a diseased or injured hoof.

Various devices have heretofore been provided to be worn by hoofed animals such as horses, cows, mules, donkeys or the like. One example of such device is shown in U.S. Pat. No. 3,794,119 wherein the device is attached over the hoof by means of straps provided with hook and loop (Velcro ®) fasteners. Another type of bandage device is shown in U.S. Pat. 4,140,116. Such devices have heretofore suffered from lack of sufficient protection to prevent water, manure and other debris from contacting an injured hoof. Other bandages have suffered from lack of sufficient fixation means to hold the same in place when worn by an active animal.

SUMMARY OF THE INVENTION

An object of the invention is to overcome the foregoing shortcomings and to provide in addition means for irrigation of medication and removal of fluids in the treatment of hoof injuries and disorders. A further object of the invention is to provide such a device with improved means to attach the same to the leg of the animal. Other objects will become apparent from the following description.

The boot of the present invention includes an enclosed lower portion for confining and protecting the hoof of an animal which is connected to a tall upper portion. The upper is preferably expandable by means of folds for ease in installing the boot on the leg of an animal and releasable means for securing the upper around the leg of the animal. The releasable means is preferably one or more straps provided with hook and loop type fasteners adapted to fasten together the top end of the upper at the reduced diameter portion of the animal's leg that is present between the dewclaws and the upwardly tapered increasing diameter portion of the leg located above the dewclaws. In the preferred embodiment a second fastening means is provided at the portion of the upper located just below the dewclaws.

The present invention further provides irrigation means in the form of hollow tubing having an accessible upper end and a branched lower end fitted under the hoof of the animal. The lower end is provided with one or more branches so that irrigation or drainage of both sides of the hoof are facilitated.

Briefly summarized, the invention provides a protective boot for an animal's hoof using a flexible covering of a general hollow ungulate shape to fit over a hoof. A fluid-tight upper portion is connected to the top of the hollow shape to provide a protective covering for the lower leg of the animal. The upper is of sufficient length to extend above the dewclaws on the animal's leg. Securing means near the top of the upper secures the top of the boot around the reduced diameter portion of the animal's leg located between the dewclaws and the larger diameter upwardly tapering portion of the leg extending thereabove.

In order to provide means for irrigation and removal of fluids, the boot of the present invention is provided with a branched crush-resistant tubing. The hollow crush-resistant tube extends from the upper portion of the boot down to the bottom of the hoof of the animal, and is provided with a branched Y-shaped or T-shaped end. The ends of the branches extend to opposite sides of the hoof. If desired, three or more branches can be used to ensure coverage of the entire area of the hoof. Thus located the tubing provides a means for a veterinary treatment solution to be injected by a syringe so that it will flow down into the hoof. After the hoof has been appropriately irrigated with such a solution, the solution may be removed from the boot by drawing it from the tubing with the syringe thereby leaving the hoof in a drier condition. The tubing also allows for drainage from the hoof of bodily fluids which may otherwise accumulate in an injured or diseased area, and thus the invention facilitates healing of the hoof. Preferably the tubing is provided with a removable, for example, screw-on cap.

DRAWINGS

Various further objects and advantages of the present invention will be apparent from the following detailed description and accompanying drawings wherein:

FIG. 1 is a perspective view of a protective boot of this invention installed over the hoof of an animal with parts shown by phantom lines;

FIG. 2 is a perspective view of the boot of FIG. 1 with the fasteners thereof shown in the open position;

FIG. 3 is a side view of the boot shown in FIG. 1;

FIG. 4 is a central cross-sectional view of the leg and boot of FIG. 3; and

FIG. 5 is a bottom view of the hoof and boot of FIG. 1 with parts shown by phantom lines.

A hoof protective boot illustrated generally by numeral 10 includes a lower portion 12 of an ungulate shape adapted to fit over an ungulate's hoof. Lower portion 12 is connected at its entire top in fluid-tight fashion to an upper portion 14 shown fitted around the leg 16 of an ungulate. Upper portion 14 is of a sufficient length, preferably approximately 11 inches, the length being of a sufficient amount to extend well above dewclaws 18 of the animal's leg.

As seen, hoof 19 is protected by lower portion 12 of the boot. By virtue of the length of upper portion 14 the entire lower leg of the animal is protected from mud, manure and the like which are encountered by the animal during the course of daily movements.

At least one fastener 20 is provided near the top of upper portion 14. In the preferred embodiment the second fastener 22 can be provided just beneath the dewclaws 18 to add further to the fastening of the boot to the animal's leg. Fasteners 20 and 22 are illustrated to be of the hook and loop type. Other types of fasteners such as snaps, buckles, cords which may be knotted or the like can be substituted if desired.

As best seen in FIG. 2, upper 14 is provided with folds 25, 26, 27 and 28 so that it can be opened in similar fashion to a conventional high top overshoe and then secured over the leg of the animal.

An irrigation tube 30 extends upwardly from the area beneath hoof 19 to a point at which it is accessible. As seen in FIGS. 3 and 4 the preferred location for the top of irrigation tube 30 is just beneath dewclaws 18. A longer irrigation tube could be used if desired extending, if desired, to a higher location. The irrigation tube 30 is tightly fitted through an opening 31 in boot 10. Boot 10, in order to provide water repellency and to tightly seal tube 30 is preferably formed from rubber or a synthetic organic elastomer. Preferably a cap 32 of either a snap-on or threaded type is provided in order to close the exposed end of tube 30 to prevent entry therein of contaminated fluid or otherwise undesirable fluids. The bottom end of tube 30 is divided into branches 34 and 36 while the branches are illustrated to be of a T-shaped configuration. Other configurations for the branches can be utilized as well, for example, Y-shaped branches or the like. Also, for some applications it is desirable to have more than two branches, for example, additional branches extending toward the front of the hoof as well as the rear.

Tube 30 should be of a crush resistant material such as stainless steel, copper, aluminum or a hard, tough crush resistant plastic material It is important that the tube not be crushed or flattened under the weight of the animal particularly should the animal step on a hard surface such as a rock.

While various preferred embodiments of the invention have been shown in the foregoing specification, it will be apparent to those skilled in the art that various changes and modifications can be made within the scope and spirit of the invention.

What is claimed is:

1. A protective boot for an animal's hoof comprising:
   a flexible covering of a general hollow ungulate shape to fit an ungulate's hoof;
   an upper portion connected to the top of said hollow covering to provide a protective covering for the lower leg of the animal, said upper portion being of sufficient length to extend above the dewclaws on the animal's leg;
   securing means near the tip of said upper portion of said boot designed to secure the upper around the reduced diameter portion of the animal's leg located above the dewclaws;
   a flexible hollow tube extending from the upper portion down to the bottom of the boot to fit under the hoof of said animal, said tube being provided with a branched end of a Y-shaped or T-shaped configuration, the ends of the branches extending to opposite sides of said hoof.

2. A device according to claim 1 wherein said securing means comprises a Velcro®-type hook and loop fastener.

3. A device according to claim 1 wherein said boot is formed from an elastomer.

4. A device according to claim 1 wherein said tubing is formed from stainless steel, copper, aluminum or a rigid plastic material.

5. A boot according to claim 4 wherein the tubing is tightly fitted through an aperture in the rear of the upper portion of said boot.

* * * * *